United States Patent
Kuehner et al.

(10) Patent No.: US 11,912,357 B2
(45) Date of Patent: Feb. 27, 2024

(54) SYSTEMS AND METHODS FOR PROVIDING DIRECTIONAL STEERING CUES

(71) Applicant: TOYOTA RESEARCH INSTITUTE, INC., Los Altos, CA (US)

(72) Inventors: Manuel Ludwig Kuehner, Mountain View, CA (US); Nicholas Charles Fishwick, San Francisco, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 133 days.

(21) Appl. No.: 17/477,158

(22) Filed: Sep. 16, 2021

(65) Prior Publication Data

US 2023/0079860 A1 Mar. 16, 2023

(51) Int. Cl.
| | |
|---|---|
| B60W 50/10 | (2012.01) |
| B60W 50/14 | (2020.01) |
| B60W 60/00 | (2020.01) |
| B62D 6/10 | (2006.01) |

(52) U.S. Cl.
CPC .............. *B62D 6/10* (2013.01); *B60W 50/10* (2013.01); *B60W 50/14* (2013.01); *B60W 60/001* (2020.02); *B60W 2050/143* (2013.01); *B60W 2510/202* (2013.01)

(58) Field of Classification Search
None
See application file for complete search history.

(56) References Cited

U.S. PATENT DOCUMENTS

| | | | |
|---|---|---|---|
| 8,660,748 B2 | 2/2014 | Springer | |
| 10,286,922 B2 | 5/2019 | Shibata | |
| 10,754,029 B2 | 8/2020 | Talamonti | |
| 10,919,542 B2 | 2/2021 | Ahmed | |
| 10,933,808 B2 | 3/2021 | Ploch | |
| 2013/0127610 A1* | 5/2013 | Sanma | B62D 1/06 340/438 |
| 2017/0274931 A1* | 9/2017 | Yang | B60K 35/00 |
| 2022/0281473 A1* | 9/2022 | LaBarbera | B62D 15/025 |

FOREIGN PATENT DOCUMENTS

| | | |
|---|---|---|
| KR | 20130034305 A | 4/2013 |
| WO | 2009018330 A2 | 2/2009 |

OTHER PUBLICATIONS

Akiyama T, JP-2021124839-A and English translation of description (Year: 2021).*
Di Campli San Vito et al., "Haptic Navigation Cues on the Steering Wheel" (https://www.researchgate.net/publication/332741893_Haptic_Navigation_Cues_on_the_Steering_Wheel), Apr. 2019.
Biomimetics and Dexterous Manipulation Lab, "AutomotiveHaptics," http://bdml.stanford.edu/Main/AutomotiveHaptics, Apr. 5, 2021.

* cited by examiner

*Primary Examiner* — James J Lee
*Assistant Examiner* — Andrew Sang Kim
(74) *Attorney, Agent, or Firm* — SHEPPARD, MULLIN, RICHTER & HAMPTON LLP; Hector A. Agdeppa; Daniel N. Yannuzzi

(57) ABSTRACT

Systems and methods are provided for influential control over a driver's operation of a vehicle's steering wheel. Upon issuing an autonomous control signal to control motive operation of the vehicle, an autonomous control system of the vehicle may reinforce or influence the application of the autonomous control signal by inducing or cuing to induce the driver's hand(s) to turn the vehicle's steering wheel in a particular direction or by a particular amount/with a particular level of torque.

16 Claims, 9 Drawing Sheets

SYSTEMS AND METHODS FOR PROVIDING DIRECTIONAL STEERING CUES

TECHNICAL FIELD

The present disclosure relates generally to autonomous driving/assisted driving (also referred to as partially automated driving), and in particular, some implementations may relate to mechanisms influencing driver interaction with a vehicle steering wheel in response to certain autonomous driving/assisted driving operations or actions, or to inform a driver of a recommended steering action(s).

DESCRIPTION OF RELATED ART

Advanced driver-assistance systems (ADAS) can refer to electronic systems that assist a vehicle operator while driving, parking, or otherwise maneuvering a vehicle. ADAS can increase vehicle and road safety by minimizing human error, and introducing some level of automated vehicle/vehicle feature control. Autonomous driving systems may go further than ADAS by leaving responsibility of maneuvering and controlling a vehicle to the autonomous driving systems. For example, an autonomous driving system may comprise some package or combination of sensors to perceive a vehicle's surroundings, and advanced control systems that interpret the sensory information to identify appropriate navigation paths, obstacles, road signage, etc.

BRIEF SUMMARY OF THE DISCLOSURE

In accordance with one embodiment, a vehicle may comprise an autonomous control system adapted to provide one or more commands to autonomously control one or more systems of the vehicle. The vehicle may further comprise an influential control component adapted to impart influential control over a driver's operation of a steering wheel of the vehicle, the imparted influential control effectuating cues for the driver to adjust the driver's actuation of the steering wheel.

In some embodiments, the influential control component comprises a directional cue wheel.

In some embodiments, the directional cue wheel is positioned on a rim surface of the steering wheel.

In some embodiments, a direction of rotation of the directional control wheel comprises one of a counterclockwise direction and a clockwise direction, the counterclockwise and clockwise directions corresponding to cues to turn the vehicle to the left and right, respectively.

In some embodiments, a speed of rotation of the directional control wheel corresponds to a target amount of steering torque to be applied to the steering wheel.

In some embodiments, the vehicle may further comprise an actuator operatively connected to the directional control wheel via a rotating shaft, the rotating shaft imparting rotational movement to the directional control wheel.

In some embodiments, the influential control component receives instructions from the autonomous control system to impart the influential control.

In some embodiments, the influential control component transmits actuation control signals to the actuator instructing the actuator to impart the rotational movement in accordance with a determined speed of rotation.

In some embodiments, the influential control component transmits actuation control signals to the actuator instructing the actuator to impart the rotational movement in accordance with a determined direction of rotation.

In accordance with another embodiment, a vehicle may comprise a processor, and a memory unit operatively connected to the processor and including computer code. The computer code, when executed, causes the processor to: monitor autonomous control signals controlling motion of the vehicle; monitor the vehicle's motion in response to the autonomous control signals; and apply influential control over a driver via a plurality of directional control wheels based on a differential between the monitored autonomous control signals and the monitored vehicle's motion in response to the autonomous control signals.

In some embodiments, each of the directional cue wheels is positioned on a hand-contacting surface of the steering wheel.

In some embodiments, each of the plurality of directional control wheels is operatively connected to an actuator via a rotating shaft, the rotating shaft imparting rotational movement to each of plurality of directional control wheels.

In some embodiments, the computer code, when executed, further causes the processor to transmit instructions from an autonomous control system of the vehicle to the actuator to impart the rotational movement.

In some embodiments, the instructions comprise actuation control signals instructing the actuator to impart the rotational movement in accordance with a determined speed of rotation.

In some embodiments, the instructions comprise actuation control signals instructing the actuator to impart the rotational movement in accordance with a determined direction of rotation.

In some embodiments, the determined direction of rotation comprises one of a counterclockwise direction and a clockwise direction, the counterclockwise and clockwise directions corresponding to cues to turn the vehicle to the left and right, respectively.

In some embodiments, a speed of rotation of the directional control wheel corresponds to a target amount of steering torque to be applied to the steering wheel.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
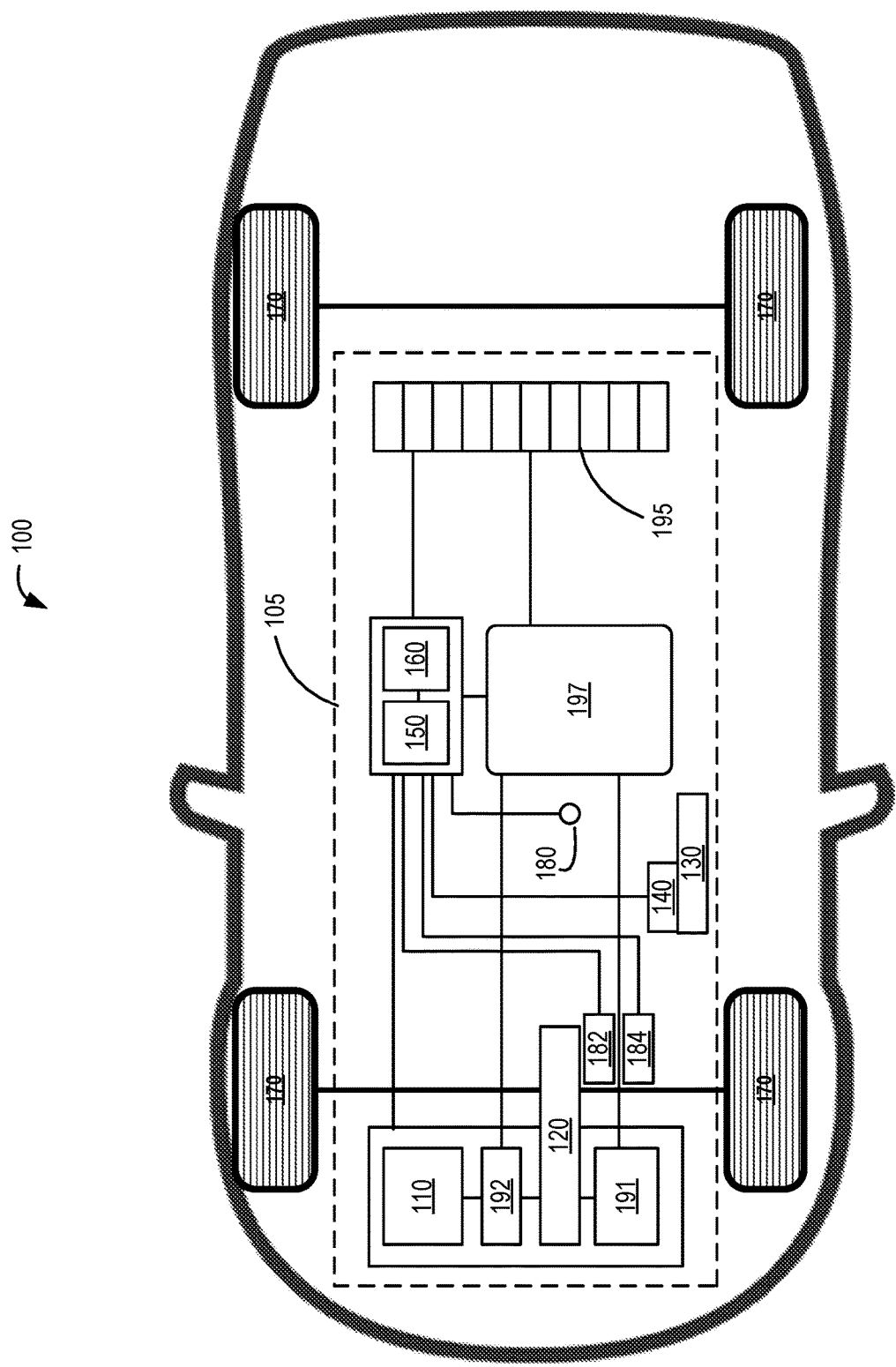
FIG. 1 is a schematic representation of an example vehicle with which embodiments of the systems and methods disclosed herein may be implemented.

The figures are not exhaustive and do not limit the present disclosure to the precise form disclosed.

DETAILED DESCRIPTION

As alluded to above, ADAS and autonomous driving control systems can be used in vehicles that at least, in part, controls or manages vehicle operation to provide varying levels of automated control or assistance, and may or may not actually influence/affect driving dynamics. For ease of reference, the term "autonomous control" will be used herein to refer to such systems. In some vehicles, an override mechanism, such as an override switch, may be used to turn off or disengage a vehicle's autonomous control system. Such an override mechanism can allow a driver/operator or passenger to assume manual control of a vehicle. When invoking conventional implementations of override mechanisms in a safety scenario (e.g., to avoid a collision), a vehicle operator engages in a human/manual situational assessment, and may intervene/override autonomous control by manually actuating a driving control mechanism, such as grasping and controlling a steering wheel, actuating a brake pedal, actuating a throttle pedal, and so on. In some vehicles, ADAS provide warning alerts or notifications to a driver, where these alerts/notifications are intended to invoke some reaction or response from the driver to, e.g., correct a current driving behavior.

It should be understood that the current (and a least a portion of a future) state of vehicular autonomous control may fall under what can be referred to as a transition period prior to the realization of fully autonomous driving. Thus, a human operator, i.e., a driver of a vehicle, may still inject some amount of control and/or may be prompted to take certain action(s), e.g., in response to some road or vehicle operating condition as alluded to above. Accordingly, embodiments of the present disclosure are directed to effectuating influential control over a driver of a vehicle. In the event a vehicle ADAS determines that influencing a driver to engage the vehicle in a particular way is warranted, one or more signals can be sent to the steering wheel. In particular, actuatable wheels or similar mechanisms (referred to herein as directional cue wheels (DCWs)) implemented in or on a steering wheel, e.g., on/within the rim of the steering wheel, may rotate in one or more directions. The rotation of the DCWs can provide influential control, e.g., augmentative or intervening control of the hand(s) of the driver vis-à-vis such DCWs. In particular, such influential control may act as an intuitive reinforcement of some action(s) being promulgated by a vehicle ADAS, e.g., so that the driver of the vehicle may understand and appreciate the autonomous control being effectuated over the vehicle. In some embodiments, such influential control, alternatively, or in addition to the aforementioned reinforcement, may act to induce or prompt the driver to impart some complementary action(s) to existing ADAS-initiated control of the vehicle, or even in response to current driver-initiated control of the vehicle. In the event the driver's current action(s) do not comport with ADAS-effectuated control (or if the driver's current action(s) should be enhanced or augmented with additional action(s)/greater level of action(s)), such influential control can make the driver aware that his/her action(s) differ from the ADAS-effectuated control and/or intervene to induce or prompt the driver to stop his/her non-conforming action(s)/behavior(s).

In some current ADASs, a torque may be applied, by/under the control of the ADAS system, to the steering wheel so that actual steering can be influenced. That is, in some scenarios, the actual driving dynamics of a vehicle can be affected by this ADAS feature.

In contrast, some embodiments of the present disclosure do not directly influence the driving dynamics of a vehicle. Rather, some embodiments result in providing a recommendation that the driver intuitively understands, but one that the driver can choose to ignore if desired. Embodiments can be especially helpful in situations where an ADAS may make a recommendation for an action to be undertaken by the driver, but the ADAS may not be very confident with the recommendation. Moreover, use of various embodiments avoids driver skill degradation/degeneration. That is, because some embodiments provide recommendations/influential cues/control only, the driver is not actually relieved from manual/mechanical control of the steering wheel, and the driver's driving skills can be maintained rather than lost (as might be the case over time/with fully autonomous vehicles).

For example, a vehicle may be approaching some obstacle in the road on which it is traversing. The driver of the vehicle may recognize a need to avert a collision with the approaching obstacle, and hence, may grip the vehicle's steering wheel to steer the car, e.g., to the right of the approaching obstacle. The ADAS may determine that a more severe turning radius may be necessary to avoid the approaching obstacle, in which case, an augmenting signal may be transmitted to the DCWs causing the DCWs to rotate in the appropriate direction to avoid the approaching obstacle. This signals to the driver that he/she should steer the vehicle in the direction of rotation.

Current ADAS may effectuate vibrations in a driver's seat, may initiate the presentation of visual or audible warnings, e.g., flashing lights, beeps, etc. However, such current warnings can be more easily ignored by a driver. Some drivers may even find such warnings to be annoying, and may in some instances, disable this aspect of the ADAS. Moreover, following the above example, it can be appreciated that some drivers may view or experience conventional audible/visual alerts or warnings to be somewhat removed from the action/operation a current ADAS seeks to prompt. For example, conventional lane assist mechanisms may initiate vibration of the driver's seat to let the driver know that he/she is veering out of a particular lane. However, a vibrating seat is contextually unrelated to how a driver should steer the vehicle. This disconnect can lead to, again, driver annoyance, or confusion as to what cues are being given to the driver/difficulty decoding or interpreting a cue(s), or worse, a driver ignoring a maneuver that should be performed to avoid a collision, accident, or other negative driving event. Conventional alerts or warning may also take time to interpret by the driver potentially leading to a delayed reaction or the introduction of undesirable latency when responding to a particular cue/influential control signal.

In contrast, various embodiments, due to the direct nature of the influential control, i.e., influence over a driver's hand(s) that can directly control a vehicle vis-à-vis the steering wheel, may be better accepted by drivers. That is, a driver may better understand that he/she needs to apply more torque/turn more sharply in response to a control signal actuating the aforementioned DCWs on the steering wheel, as opposed to feeling a seat vibrate, hearing a "random" beep, etc. A driver may simply better understand why the ADAS or autonomous control of the vehicle involves a particular maneuver(s) by virtue of the influential control, making the driving experience more enjoyable, perceived to be less intrusive, intuitive, etc. Over time, the driving behavior of a driver may be altered due to such influential control reinforcement.

It should be understood in some embodiments, influential control as contemplated herein may further include, but is not limited to and intervening control action. For example, in the event that a driver attempts to steer or otherwise control a vehicle in some manner contrary to an autonomous control-determined operation(s), some embodiments may effectuate intervening control. A scenario may arise where a vehicle may be approaching a moving road obstacle, such as another vehicle or bicycle. In response, the driver may attempt to turn right to avoid the road obstacle. The ADAS may determine that the vehicle should instead turn left (rather than veer to the right) to avoid the road obstacle, in which case, various embodiments may effectuate an influential control signal that comprises an intervening control signal. Such an intervening control signal may control the aforementioned DCWs to rotate or spin in a counter-clockwise direction (to the left) in order to provide a cue that the driver should turn the steering wheel to the left. In this way, the ADAS may effectively communicate, to the driver, that he/she is engaging in some action/operation that might be detrimental, is unwarranted, etc. Again, conventional systems and methods of influencing a driver may not be as effective as intended because the typical alerts do not involve one of a driver's closest point of control/contact with the vehicle—the steering wheel.

Moreover, effectuating a hand-based response can reduce latency/reaction time on the part of the driver. Again, conventional ADAS may present some form(s) of audible/visual warning. However, it may take the driver some time to: (a) pick up on the warning; (b) understand what the warning is for; and (c) engage in or initiate some reactive/responsive action. Various embodiments may avoid such delays in reaction by directly influencing a driver's application of torque/turning of a steering wheel.

The systems and methods disclosed herein may be implemented with or by any of a number of different vehicles and vehicle types. For example, the systems and methods disclosed herein may be used with automobiles, trucks, motorcycles, recreational vehicles and other like on-or off-road vehicles. In addition, the principles disclosed herein may also extend to other vehicle types as well. An example hybrid electric vehicle is illustrated and described below as one example.

FIG. 1 illustrates an example hybrid electric vehicle (HEV) 100 in which various embodiments for driver disengagement of autonomous vehicle/driving controls may be implemented. It should be understood that various embodiments disclosed herein may be applicable to/used in various vehicles (internal combustion engine (ICE) vehicles, fully electric vehicles (EVs), etc.) that are fully or partially autonomously controlled/operated, not only HEVs.

HEV 100 can include drive force unit 105 and wheels 170. Drive force unit 105 may include an engine 110, motor generators (MGs) 191 and 192, a battery 195, an inverter 197, a brake pedal 130, a brake pedal sensor 140, a transmission 120, a memory 160, an electronic control unit (ECU) 150, a shifter 180, a speed sensor 182, and an accelerometer 184.

Engine 110 primarily drives the wheels 170. Engine 110 can be an ICE that combusts fuel, such as gasoline, ethanol, diesel, biofuel, or other types of fuels which are suitable for combustion. The torque output by engine 110 is received by the transmission 120. MGs 191 and 192 can also output torque to the transmission 120. Engine 110 and MGs 191 and 192 may be coupled through a planetary gear (not shown in FIG. 1B). The transmission 120 delivers an applied torque to the wheels 170. The torque output by engine 110 does not directly translate into the applied torque to the wheels 170.

MGs 191 and 192 can serve as motors which output torque in a drive mode, and can serve as generators to recharge the battery 195 in a regeneration mode. The electric power delivered from or to MGs 191 and 192 passes through inverter 197 to battery 195. Brake pedal sensor 140 can detect pressure applied to brake pedal 130, which may further affect the applied torque to wheels 170. Speed sensor 182 is connected to an output shaft of transmission 120 to detect a speed input which is converted into a vehicle speed by ECU 150. Accelerometer 184 is connected to the body of HEV 100 to detect the actual deceleration of HEV 100, which corresponds to a deceleration torque.

Transmission 120 is a transmission suitable for an HEV. For example, transmission 120 can be an electronically controlled continuously variable transmission (ECVT), which is coupled to engine 110 as well as to MGs 191 and 192. Transmission 120 can deliver torque output from a combination of engine 110 and MGs 191 and 192. The ECU 150 controls the transmission 120, utilizing data stored in memory 160 to determine the applied torque delivered to the wheels 170. For example, ECU 150 may determine that at a certain vehicle speed, engine 110 should provide a fraction of the applied torque to the wheels while MG 191 provides most of the applied torque. ECU 150 and transmission 120 can control an engine speed ($N_E$) of engine 110 independently of the vehicle speed (V).

ECU 150 may include circuitry to control the above aspects of vehicle operation. ECU 150 may include, for example, a microcomputer that includes one or more processing units (e.g., microprocessors), memory storage (e.g., RAM, ROM, etc.), and I/O devices. ECU 150 may execute instructions stored in memory to control one or more electrical systems or subsystems in the vehicle. ECU 150 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., anti-lock braking system (ABS) or electronic stability control (ESC)), battery management systems, and so on. These various control units can be implemented using two or more separate electronic control units, or using a single electronic control unit.

MGs 191 and 192 each may be a permanent magnet type synchronous motor including for example, a rotor with a permanent magnet embedded therein. MGs 191 and 192 may each be driven by an inverter controlled by a control signal from ECU 150 so as to convert direct current (DC) power from battery 195 to alternating current (AC) power, and supply the AC power to MGs 191, 192. MG 192 may be driven by electric power generated by motor generator MG191. It should be understood that in embodiments where MG191 and MG192 are DC motors, no inverter is required. The inverter, in conjunction with a converter assembly may also accept power from one or more of MGs 191, 192 (e.g., during engine charging), convert this power from AC back to DC, and use this power to charge battery 195 (hence the name, motor generator). ECU 150 may control the inverter, adjust driving current supplied to MG 192, and adjust the current received from MG191 during regenerative coasting and braking.

Battery 195 may be implemented as one or more batteries or other power storage devices including, for example, lead-acid batteries, lithium ion, and nickel batteries, capacitive storage devices, and so on. Battery 195 may also be charged by one or more of MGs 191, 192, such as, for example, by regenerative braking or by coasting during which one or more of MGs 191, 192 operates as generator. Alternatively (or additionally, battery 195 can be charged by MG 191, for example, when HEV 100 is in idle (not moving/not in drive). Further still, battery 195 may be charged by a battery charger (not shown) that receives energy from engine 110. The battery charger may be switched or otherwise controlled to engage/disengage it with battery 195. For example, an alternator or generator may be coupled directly or indirectly to a drive shaft of engine 110 to generate an electrical current as a result of the operation of engine 110. Still other embodiments contemplate the use of one or more additional motor generators to power the rear wheels of a vehicle (e.g., in vehicles equipped with 4-Wheel Drive), or using two rear motor generators, each powering a rear wheel.

Battery 195 may also be used to power other electrical or electronic systems in the vehicle. Battery 195 can include, for example, one or more batteries, capacitive storage units, or other storage reservoirs suitable for storing electrical energy that can be used to power MG 191 and/or MG 192. When battery 195 is implemented using one or more batteries, the batteries can include, for example, nickel metal hydride batteries, lithium ion batteries, lead acid batteries, nickel cadmium batteries, lithium ion polymer batteries, and other types of batteries.

Figure 2A:
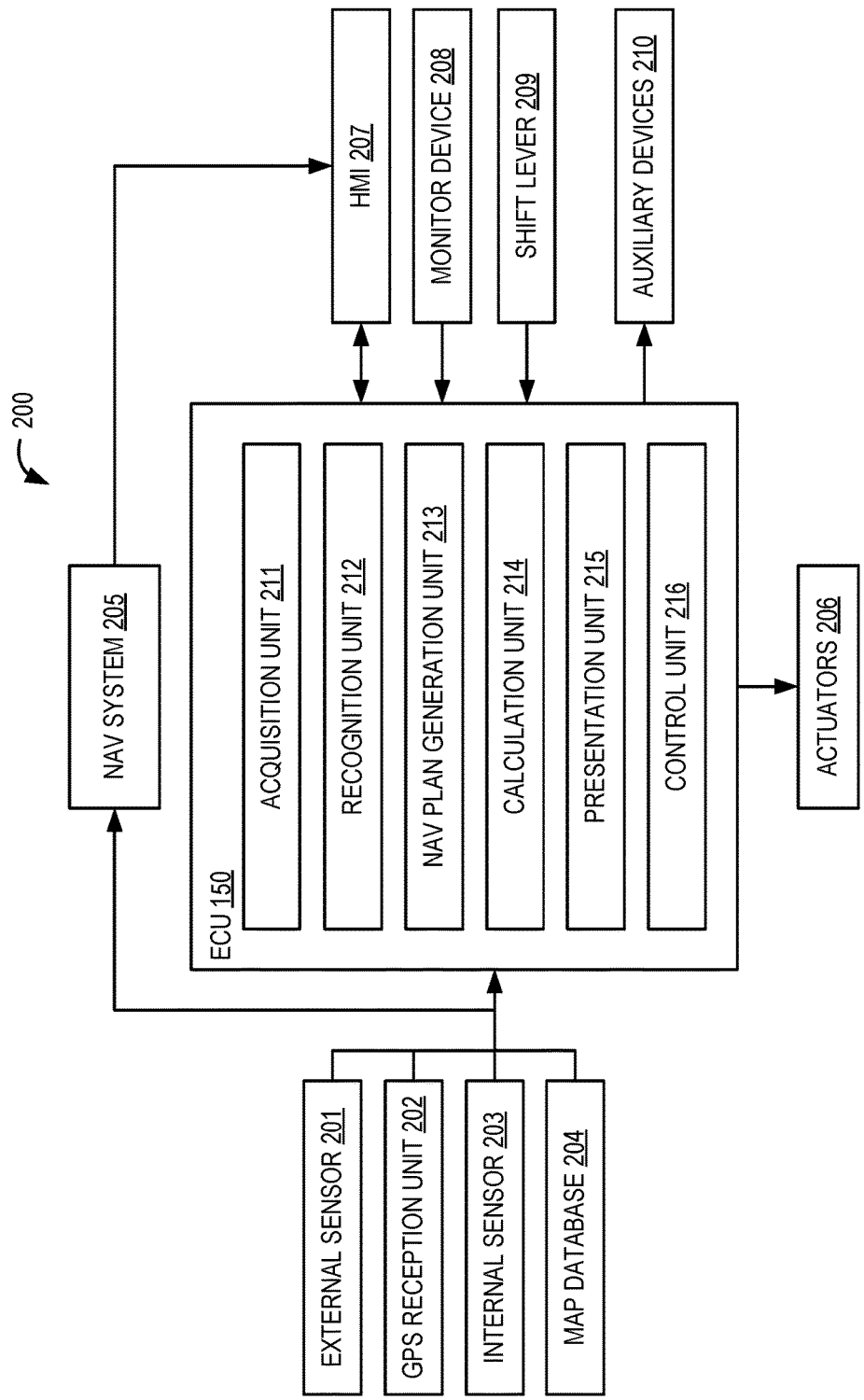
FIG. 2A illustrates an example autonomous control system.

FIG. 2A illustrates an example autonomous control system 200 that may be used to autonomously control a vehicle, e.g., HEV 100. Autonomous control system 200 may be installed in HEV 100, and executes autonomous control of HEV 100. As described herein, autonomous control can refer to control that executes driving/assistive driving operations such as acceleration, deceleration, and/or steering of a vehicle, general movement of the vehicle, without necessarily depending or relying on driving operations/directions by a driver or operator of the vehicle.

As an example, autonomous control may include lane keeping assist control where a steering wheel (not shown) is steered automatically (namely, without depending on a steering operation by the driver) such that HEV 100 does not depart from a running lane. That is, the steering wheel is automatically operated/controlled such that HEV 100 runs along the running lane, even when the driver does not perform any steering operation. As alluded to above, other autonomous control may include assistive driving mechanisms in the form of, e.g., visual or audible alerts or warnings, indirect haptic feedback, such as vibrating the driver's seat, etc.

As another example, autonomous control may include navigation control, where when there is no preceding vehicle in front of the HEV 100, constant speed (cruise) control is effectuated to make HEV 100 run at a predetermined constant speed. When there is a preceding vehicle in front of HEV 100, follow-up control is effectuated to adjust HEV 100's speed according to a distance between HEV 100 and the preceding vehicle.

In some scenarios, switching from autonomous control to manual driving may be executed. Whether or not to execute this switch from autonomous control to manual driving may be determined based on a comparison between a comparison target and a threshold. In one embodiment, the comparison target is quantified so as to be compared with the threshold.

When the comparison target is equal to or more than the threshold, the autonomous control system 200 executes the switch from an autonomous control mode to a manual driving mode. In other situations/scenarios, autonomous control system 200 may take over operation, effecting a switch from manual driving/control to autonomous control. As will be discussed in greater detail below, autonomous control system 200 may make certain determinations regarding whether to comply or proceed with autonomous control based on a command from autonomous control system 200. For example, considerations regarding recoverability and vehicle control under certain conditions may be considered as factors in determining whether or not autonomous control can be safely executed. Such considerations may also be reflected as thresholds for comparison.

For example, when an operation amount of any of a steering operation, an acceleration operation, and brake operation by the driver of HEV 100 during the autonomous driving control becomes equal to or more than a threshold, autonomous control system 200 may execute a switch from autonomous control to manual control.

It should be understood that manual control or manual driving can refer to a vehicle operating status wherein a vehicle's operation is based mainly on driver-controlled operations/maneuvers. In an ADAS context, driving operation support control can be performed during manual driving. For example, a driver may be actively performing any of a steering operation, an acceleration operation, and a brake operation of the vehicle, while autonomous control apparatus 200 performs some subset of one or more of those operations, e.g., in an assistive, complementary, or corrective manner. As another example, driving operation support control adds or subtracts an operation amount to or from the operation amount of the manual driving (steering, acceleration, or deceleration) that is performed by the driver. It should be understood that in such scenarios, use of influential control over a driver's steering hand(s), because a driver is already engaging in a "proper" operation, may enforce or positively reinforce the driver's action(s).

In the example shown in FIG. 2A, autonomous control system 200 is provided with an external sensor 201, a GPS (Global Positioning System) reception unit 202, an internal sensor 203, a map database 204, a navigation system 205, actuators 206, an HMI (Human Machine Interface) 207, a monitor device 208, a shift lever 209, auxiliary devices 210. Autonomous control system 200 may communicate with ECU 150, or in some embodiments (may be implemented with its own ECU).

In the example shown in FIG. 2A, external sensor 201 is a detector that detects external circumstances such as surrounding information of HEV 100. The external sensor 201 may include at least one of a camera, a radar, and a Laser Imaging Detection and Ranging (LIDAR) unit.

The camera unit may be an imaging device that images the external circumstances surrounding the vehicle. For example, the camera is provided on a back side of a front windshield of the vehicle. The camera may be a monocular camera or a stereo camera. The camera outputs, to the ECU 150, image information on the external circumstances surrounding the vehicle. The camera is not limited to a visible light wavelength camera but can be an infrared camera.

The radar unit uses radio waves to detect obstacles outside of the vehicle by transmitting radio waves to the surroundings of the vehicle, and receiving reflected radio waves from an obstacle to detect the obstacle, distance to the obstacle or a relative positional direction of the obstacle. The radar unit outputs detected obstacle information to the ECU 150.

The LIDAR unit may operate similar to the manner in which the radar unit operates except that light is used in place of radio waves. The LIDAR unit outputs detected obstacle information to the ECU 150.

In the example shown in FIG. 2A, GPS reception unit 202 receives signals from three or more GPS satellites to obtain position information indicating a position of HEV 100. For example, the position information can include latitude information and longitude information. The GPS reception unit 202 outputs the measured position information of the vehicle to the ECU 150.

In the example shown in FIG. 2A, the internal sensor 203 is a detector for detecting information regarding, e.g., a running status of HEV 100, operational/operating conditions, e.g., amount of steering wheel actuation, rotation, angle, amount of acceleration, accelerator pedal depression, brake operation by the driver of HEV 100. The internal sensor 203 includes at least one of a vehicle speed sensor, an acceleration sensor, and a yaw rate sensor. Moreover, internal sensor 203 may include at least one of a steering sensor, an accelerator pedal sensor, and a brake pedal sensor.

A vehicle speed sensor is a detector that detects a speed of the HEV 100. In some embodiments, HEV 100's speed may be measured directly or through calculations/inference depending on the operating conditions/status of one or more other components of HEV 100. For example, a wheel speed sensor can be used as the vehicle speed sensor to detect a rotational speed of the wheel, which can be outputted to ECU 150.

The acceleration sensor can be a detector that detects an acceleration of the vehicle. For example, the acceleration sensor may include a longitudinal acceleration sensor for detecting a longitudinal acceleration of HEV 100, and a lateral acceleration sensor for detecting a lateral acceleration of HEV 100. The acceleration sensor outputs, to the ECU 150, acceleration information.

The yaw rate sensor can be a detector that detects a yaw rate (rotation angular velocity) around a vertical axis passing through the center of gravity of HEV 100. For example, a gyroscopic sensor is used as the yaw rate sensor. The yaw rate sensor outputs, to the ECU 150, yaw rate information including the yaw rate of HEV 100.

The steering sensor may be a detector that detects an amount of a steering operation/actuation with respect to a steering wheel 30 by the driver of HEV 100. The steering operation amount detected by the steering sensor may be a steering angle of the steering wheel or a steering torque applied to the steering wheel, for example. The steering sensor outputs, to the ECU 150, information including the steering angle of the steering wheel or the steering torque applied to the steering wheel of HEV 100.

The accelerator pedal sensor may be a detector that detects a stroke amount of an accelerator pedal, for example, a pedal position of the accelerator pedal with respect to a reference position. The reference position may be a fixed position or a variable position depending on a determined parameter. The accelerator pedal sensor is provided to a shaft portion of the accelerator pedal AP of the vehicle, for example. The accelerator pedal sensor outputs, to the ECU 150, operation information reflecting the stroke amount of the accelerator pedal.

The brake pedal sensor may be a detector that detects a stroke amount of a brake pedal, for example, a pedal position of the brake pedal with respect to a reference position. Like the accelerator position, a brake pedal reference position may be a fixed position or a variable position depending on a determined parameter. The brake pedal sensor may detect an operation force of the brake pedal (e.g. force on the brake pedal, oil pressure of a master cylinder, and so on). The brake pedal sensor outputs, to the ECU 150, operation information reflecting the stroke amount or the operation force of the brake pedal.

A map database 204 may be a database including map information. The map database 204 is implemented, for example, in a disk drive or other memory installed in HEV 100. The map information may include road position information, road shape information, intersection position information, and fork position information, for example. The road shape information may include information regarding a road type such as a curve and a straight line, and a curvature angle of the curve. When autonomous control system 200 uses a Simultaneous Localization and Mapping (SLAM) technology or position information of blocking structural objects such as buildings and walls, the map information may further include an output signal from external sensor 201. In some embodiments, map database 204 may be a remote data base or repository with which HEV 100 communicates.

Navigation system 205 may be a component or series of interoperating components that guides the driver of HEV 100 to a destination on a map designated by the driver of HEV 100. For example, navigation system 205 may calculate a route followed or to be followed by HEV 100, based on the position information of HEV 100 measured by GPS reception unit 202 and map information of map database 204. The route may indicate a running lane of a section(s) of roadway in which HEV 100 traverses, for example. Navigation system 205 calculates a target route from the current position of HEV 100 to the destination, and notifies the driver of the target route through a display, e.g., a display of a head unit, HMI 207 (described below), and/or via audio through a speaker(s) for example. The navigation system 205 outputs, to the ECU 150, information of the target route for HEV 100. In some embodiments, navigation system 205 may use information stored in a remote database, like map database 204, and/or some information processing center with which HEV 100 can communicate. A part of the processing executed by the navigation system 205 may be executed remotely as well.

Actuators 206 may be devices that execute running controls of HEV 100. The actuators 206 may include, for example, a throttle actuator, a brake actuator, and a steering actuator. For example, the throttle actuator controls, in accordance with a control signal output from the ECU 150, an amount by which to open the throttle of HEV 100 to control a driving force (the engine) of HEV 100. In another example, actuators 206 may include one or more of MGs 191 and 192, where a control signal is supplied from the ECU 150 to MGs 191 and/or 192 to output motive force/energy. The brake actuator controls, in accordance with a control signal output from the ECU 150, the amount of braking force to be applied to each wheel of the vehicle, for example, by a hydraulic brake system. The steering actuator controls, in accordance with a control signal output from the ECU 150, driving an assist motor of an electric power steering system that controls steering torque.

HMI 207 may be an interface used for communicating information between a passenger(s) (including the operator) of HEV 100 and autonomous control system 200. For example, the HMI 207 may include a display panel for displaying image information for the passenger(s), a speaker for outputting audio information, and operation buttons or a touch panel used by the occupant for performing an input operation. HMI 207 may also or alternatively transmit the information to the passenger(s) through a mobile information terminal connected wirelessly and receive the input operation by the passenger(s) through the mobile information terminal.

Monitor device 208 monitors a status of the driver/operator. The monitor device 208 can check a manual driving preparation state of the driver. More specifically, the monitor device 208 can check, for example, whether or not the driver is ready to start manual operation of HEV 100. Moreover, the monitor device 208 can check, for example, whether or not the driver has some intention of switching HEV 100 to a manual mode of operation.

For example, the monitor device 208 may be a camera that can take an image of the driver, where the image can be used for estimating the degree to which the driver's eyes are open, the direction of the driver's gaze, whether or not the driver is holding the steering wheel, etc. Monitor device 208 may also be a pressure sensor for detecting the amount of pressure the driver's hand(s) are applying to the steering wheel. As another example, the monitor device 208 can be a camera that takes an image of a hand of the driver.

A shift lever 209 can be positioned at a shift position, e.g., "A (AUTOMATIC)," "D (DRIVE)," etc. The shift position "A" indicates, for example, an automatic engage mode where autonomous control is engaged automatically. The shift position "D" indicates a triggered engage mode where autonomous control is engaged in response to a driver-initiated request to operate HEV 100 in an autonomous driving mode.

Auxiliary devices 210 may include devices that can be operated by the driver of the vehicle, but are not necessarily drive-related, such as actuators 206. For example, auxiliary devices 210 may include a direction indicator, a headlight, a windshield wiper and the like.

ECU 150 may execute autonomous control of the vehicle, and may include an acquisition unit 211, a recognition unit 212, a navigation plan generation unit 213, a calculation unit 214, a presentation unit 215, and a control unit 216.

Acquisition unit 211 may obtain the following operation amounts or levels of actuation based on the information obtained by the internal sensor 203: steering operation, acceleration operation, and brake operation by the driver during an autonomous control mode; and the level of steering operation, acceleration operation, and brake operation by the driver of the vehicle during a manual control mode.

Recognition unit 212 may recognize or assess the environment surrounding or neighboring HEV 100 based on the information obtained by the external sensor 201, the GPS reception unit 202, and/or the map database 204. For example, the recognition unit 212 includes an obstacle recognition unit (not shown), a road width recognition unit (not shown), and a facility recognition unit (not shown). The obstacle recognition unit recognizes, based on the information obtained by the external sensor 201, obstacles surrounding the vehicle. For example, the obstacles recognized by the obstacle recognition unit include moving objects such as pedestrians, other vehicles, motorcycles, and bicycles and stationary objects such as a road lane boundary (white line, yellow line), a curb, a guard rail, poles, a median strip, buildings and trees. The obstacle recognition unit obtains information regarding a distance between the obstacle and the vehicle, a position of the obstacle, a direction, a relative velocity, a relative acceleration of the obstacle with respect to the vehicle, and a category and attribution of the obstacle. The category of the obstacle includes a pedestrian, another vehicle, a moving object, and a stationary object. The attribution of the obstacle can refer to a property of the obstacle such as hardness and a shape of the obstacle.

The road width recognition unit recognizes, based on the information obtained by the external sensor 201, the GPS reception unit 202, and/or the map database 204, a road width of a road in which the vehicle is running.

The facility recognition unit recognizes, based on the map information obtained from the map database 204 and/or the vehicle position information obtained by the GPS reception unit 202, whether or not HEV 100 is operating/being driven through an intersection, in a parking structure, etc. The facility recognition unit may recognize, based on the map information and the vehicle position information, whether or not the vehicle is running in a school zone, near a childcare facility, near a school, or near a park, etc.

Navigation plan generation unit 213 may generate a navigation plan for HEV 100 based on the target route calculated by the navigation system 205, the information on obstacles surrounding HEV 100 recognized by recognition unit 212, and/or the map information obtained from map database 204. The navigation plan may be reflect one or more operating conditions/controls to effectuate the target route. For example, the navigation plan can include a target speed, a target acceleration, a target deceleration, a target direction, and/or a target steering angle with which HEV 100 should be operated at any point(s) along the target route so that the target route can be achieved to reach a desired destination. It should be understood that navigation plan generation unit 213 generates the navigation plan such that HEV 100 operates along the target route while satisfying one or more criteria and/or constraints, including, for example, safety constraints, legal compliance rules, operating (fuel/energy) efficiency, and the like. Moreover, based on the existence of obstacles surrounding HEV 100, the navigation plan generation unit 213 generates the navigation plan for the vehicle so as to avoid contact with such obstacles.

Calculation unit 214 may calculate a threshold used for determining whether or not to switch from autonomous control to manual driving or vice versa. The determination can be performed based on the operating levels associated with the manner in which the driver is operating HEV 100 during autonomous control which is obtained by the acquisition unit 211. For example, the driver of HEV 100 may suddenly grasp the steering wheel (which can be sensed by internal sensor 203) and stomp on the brake pedal (which can be sensed by monitor device 208). The pressure on the steering wheel and the level of actuation of the brake pedal may be excessive enough (exceed a threshold) suggesting that the driver intends to override the autonomous control system 200.

Presentation unit 215 displays, on a display of the HMI 207, a threshold which is calculated by the calculation unit 214 and used for determining whether or not to execute the switching from autonomous control to the manual driving or vice versa.

Control unit 216 can autonomously control HEV 100 based on the navigation plan generated by navigation plan generation unit 213. The control unit 216 outputs, to the actuators 206, control signals according to the navigation plan. That is, the control unit 216 controls actuators 206 based on the navigation plan, and thereby autonomous control of HEV 100 is executed/achieved. Moreover, certain levels of operation, e.g., steering wheel actuation, by the driver can be detected by the acquisition unit 211. When such level(s) equal or exceed the threshold calculated by the calculation unit 214 in a period during which autonomous control is being used to operate HEV 100, control unit 216 executes a switching from autonomous control to manual control.

Figure 2B:
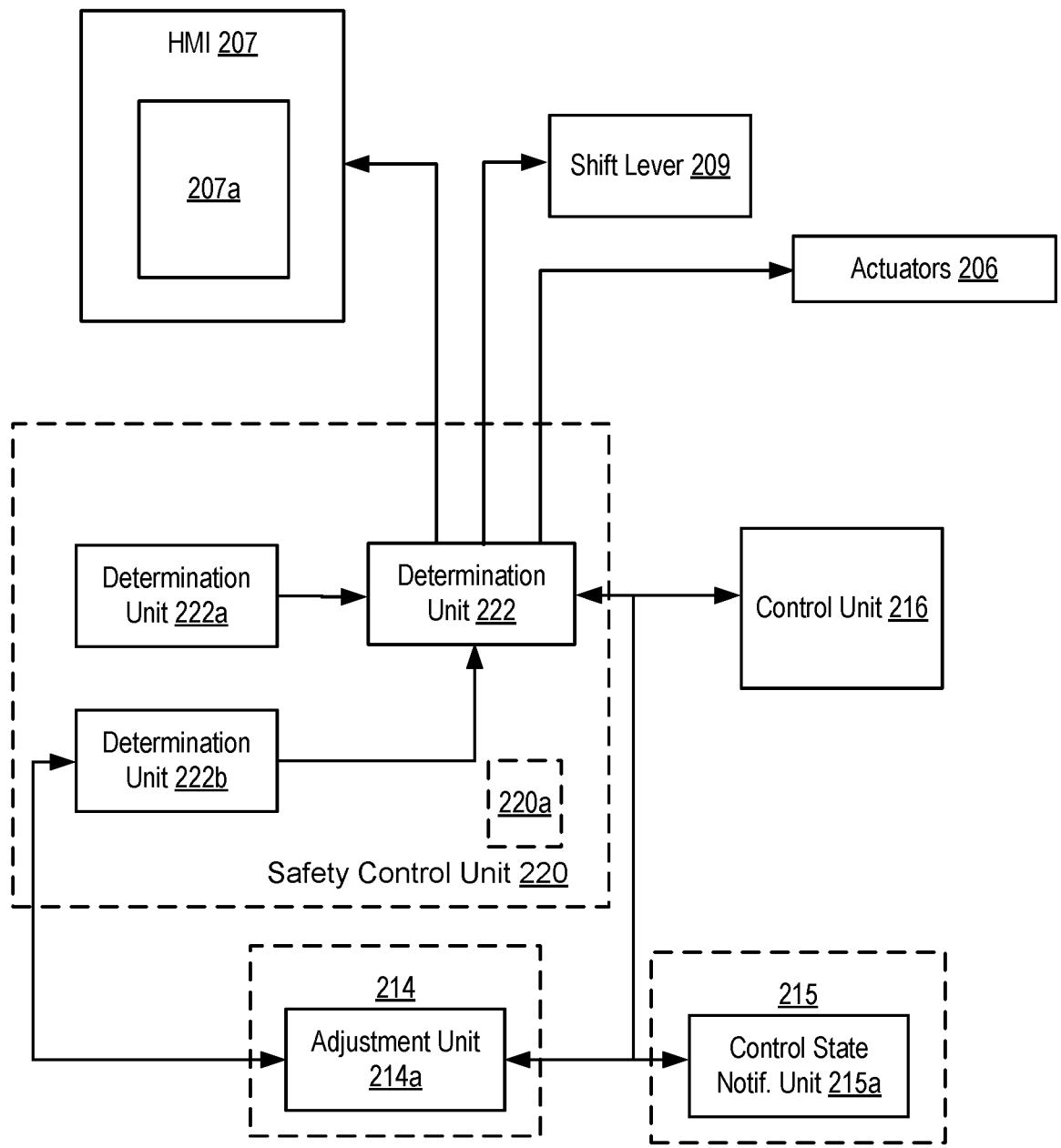
FIG. 2B illustrates an example safety control unit aspect of the autonomous control system of FIG. 2A.

Referring to FIG. 2B, control unit 216 operatively interacts with safety control unit 220 that determines whether or not autonomous control system 200 (in particular, control unit 216) can engage (activate, start) in autonomous control of HEV 100. For example, safety control unit 220 may include one or more determination units, e.g., determination unit 222*a* determines whether or not autonomous control can be engaged, based on a difference between a vehicle position calculated from signals received by the GPS reception unit 202 and an actual vehicle position calculated based on an output signal from the external sensor 201, the map information of the map database 204 and so forth. For example, a threshold condition associated with engagement of autonomous control in HEV 100 may be predicated on travel along a certain type of roadway, e.g., known segment(s) of road within map database 204, such as a freeway (versus) country lane. Road curvature may be another condition/characteristic on which autonomous control of HEV 100 may be based. Determination unit 222*a* may make its determination based on one or more determinative factors.

Control unit 216 may further interact with a determination unit 222*b* of safety control unit 220 that determines whether or not a trigger to deactivate (stop) an autonomous control mode exists. For example, determination unit 222*b* can determine whether or not to execute the switch from the autonomous control to manual control based on the level of steering wheel actuation, brake pedal actuation, etc. effectuated by the driver while HEV 100 is being operated in an autonomous control mode, which is obtained by the acquisition unit 211. Other determinative factors or considerations may be the amount of acceleration or deceleration experienced by HEV 100, also determined by acquisition unit 211. When determination unit 222 determines that the autonomous control can be engaged, based on the determinations performed by determination units 222*a* and/or 222*b*, control unit 216 engages autonomous control of HEV 100. That is, determination unit 222 may act as a determination aggregator that aggregates determinations rendered by other determination units. Determination unit 222 may be a circuit, e.g., application-specific integrated circuit, logic, software, or some combination thereof that processes the individual determinations rendered by the other determination units (e.g., determination units 222*a* and 222*b*) to render an overall determination. That overall determination may control operation of control unit 216, e.g., to disengage autonomous control and switch to manual control or engage in autonomous control.

On the other hand, when determination units 222*a* and/or 222*b* determine that a switch from autonomous control to the manual control should be executed, autonomous control is deactivated/disengaged by control unit 216 or control unit 216 is itself deactivated/disengaged, and the driver proceeds to manually control HEV 100. It should be understood that other determination units may be used (or only a single determination unit may be used). In the case of multiple determination units being used, in some embodiments, any single determination that manual control should be executed can serve as a trigger to deactivate autonomous control. In some embodiments, presentation unit 215 is provided with a control state notification unit 215*a* that notifies the driver of a fact that HEV 100 is operating under autonomous control is in execution, and so forth. Such a notification may be displayed on a display of HMI 207, for example. Likewise, If a switch from autonomous control to the manual control is executed, the control state notification unit 215*a* displays, on the display of HMI 207 a corresponding notification.

HMI 207, in some embodiments, may include an autonomous control engagement trigger input unit 207*a* that can be actuated by the driver of HEV 100 to engage in an autonomous control mode (after safety control unit 220 determines that autonomous control can be effectuated).

In some embodiments, the driver of HEV 100 may be able to select an automatic autonomous control engage mode, where autonomous control unit 216 can be automatically engaged when safety control unit 220 determines that the autonomous control can be engaged. In some embodiments, shift lever 209 may be used to set a triggered autonomous control mode and an automatic engage mode (as alluded to above by actuating shift lever 209 to an "A" (AUTOMATIC) position or to a "D" (DRIVE) position.

Figure 3:
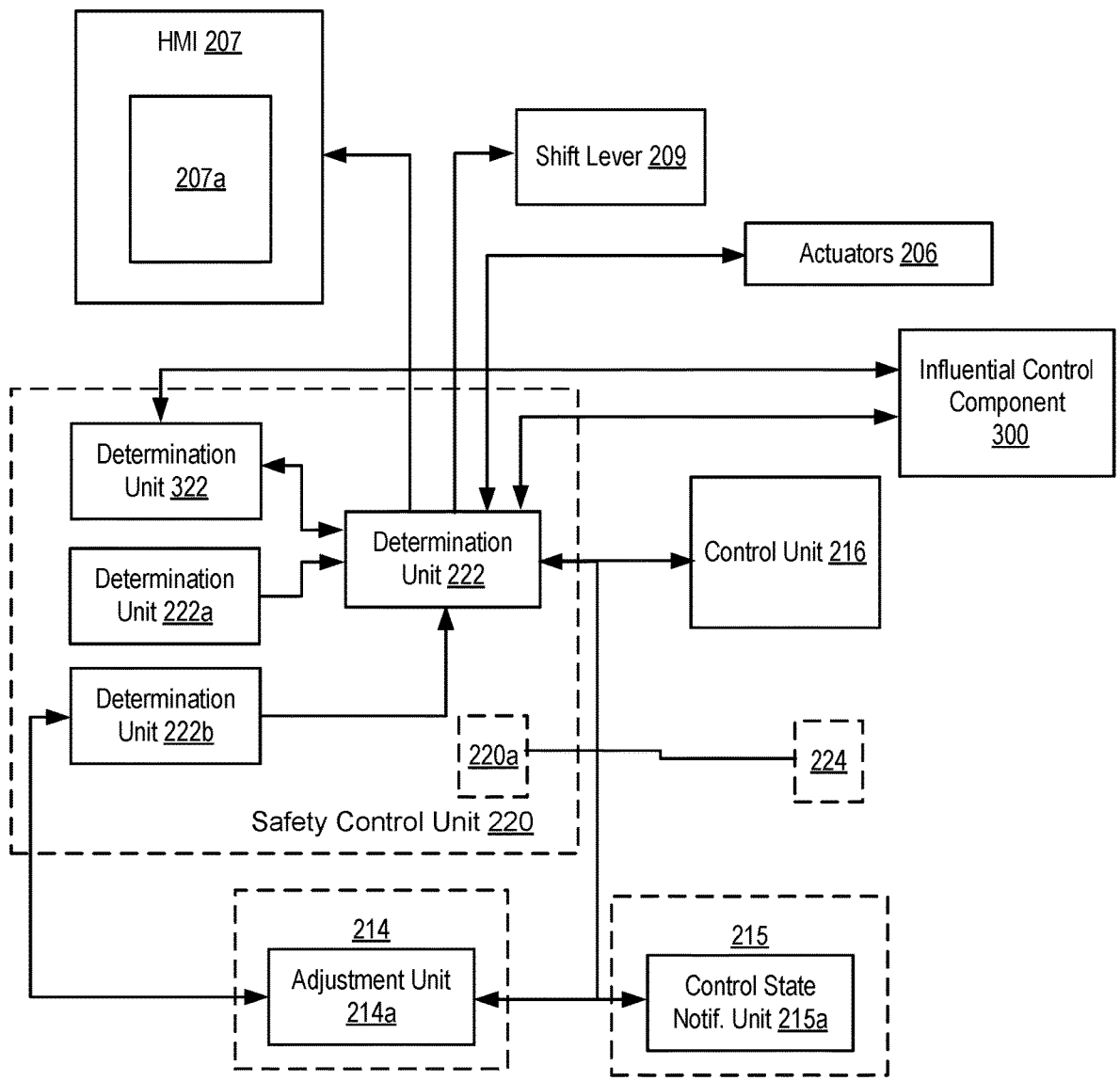
FIG. 3 illustrates an example influential control mechanism in accordance with various embodiments.

As alluded to above, an influential control mechanism may be used to effectuate influential control over a driver's use of an actuator, e.g., a steering wheel. FIG. 3 illustrates an example implementation of such an influential control mechanism. That is, in addition the above-described components and functionality of autonomous control system 200, FIG. 3 illustrates an influential control component 300 that is operatively connected to determination unit 222, which in turn is operatively connected to determining unit 322.

Determination unit 322, like the other determination units 222, 222*a*, and/or 222*b*, may comprise logic, circuitry, software, or some combination thereof effectuating processing and determining capabilities described in conjunction with FIG. 4. Information regarding the actuation or intended actuation of one of actuators 206, such as a steering wheel actuator and an actuator(s) used to actuate (e.g., turn/rotate) a DCW in a particular direction, may be transmitted to determination unit 322 via determination unit 222.

Determination unit 322 may comprise logic that upon receiving a signal or notification that an actuator 206, in one instance, the steering wheel actuator, is being actuated or operated in some way, determines whether augmented or intervening control should be effectuated for the driver. In some embodiments, such signals or notifications may simply be used to trigger an augmented control response in the form of a signal to influential control component 300, e.g., DCWs implemented in/on the steering wheel. The signal instructs or causes influential control component 300 to, in this case influence or suggest to the driver that he/should turn the steering wheel in a particular direction, or to some particular angle of rotation. In some embodiments, such signals or notifications may be used to trigger an intervening control response in the form of a signal to influential control component 300, again one or more DCW(s). In this case, the signal may instruct or cause influential control component 300 to provide a cue to the driver to turn the steering wheel in a particular direction or by some particular amount.

In some embodiments, determination unit 322 may transmit such signals or notifications in response to an indication/signal/notification regarding the actuation of one or more actuators 206, such as actuation of the steering wheel/steering wheel actuator. In some embodiments, determination unit 322 may compare feedback regarding actual actuation of one or more actuators 206 and intended actuation (e.g., control signals output by control unit 216). If the comparison indicates that a level of actual actuation of actuators 206 does not meet the level of the intended actuation, determination unit 322 may transmit augmenting signals to influential control component 300 to prompt the driver to exert a greater level of actuation.

In some embodiments, as noted above, the augmenting signals are meant to reinforce compliance with or understanding of the current actuation or operation (or level(s) thereof) of actuators 206. For example, navigating a turn may take one second, during which control unit 216 sends a plurality of control signals to iteratively control a vehicle as it turns. During the time period of the turn, determination unit 322 may, in response to control unit 216 signals sent to actuators 206 vis-à-vis determination unit 222 compare the control unit 216 signals with actuation feedback from actuators 206. As the turn is being navigated, such comparisons may indicate actuators 206, e.g., a steering wheel actuator should continue to turn (apply steering torque in a particular direction in accordance with a certain level of actuation/angle of rotation). Accordingly, determination unit 322 may signal influential control component 300 to induce the driver to apply the requisite amount of steering torque/additional steering torque in the requisite direction. In some instances, determination unit 222 may receive information from other units, e.g., recognition unit 212, navigation plan generation unit 213, calculation unit 214, etc. (or feedback from influential control component 300 or actuators 206), that the vehicle is in some way, not moving or acting/reacting in a desired manner. In response to such a determination, determination unit 322 may signal influential control component 300 to, e.g., prompt the driver to actuate the steering in accordance with the cues provided by influential control component 300.

In some embodiments, calculation unit 214 may calculate one or more thresholds against which determination unit 322 may compare its received information, feedback, etc. to determine whether or not to instruct influential control component 300 to effectuate augmented control or intervention control. Following a previous example, the driver of HEV 100 may suddenly grasp the steering wheel (which can be sensed by internal sensor 203). The pressure on the steering wheel and the level of actuation of the steering wheel may be excessive enough (exceeds a threshold) suggesting that the driver intends to override the autonomous control system 200. If a determination is made, e.g., by safety control unit 220, one or more other determination units, or some combination thereof, that the driver's intend action(s) is not warranted or would result in some negative event, determination unit 322 may signal to influential control component 300 to impart intervening control. In some embodiments, intervening control may be embodied by influential control component 300, e.g., one or more DCWs, that provide a cue(s) to the driver to turn the steering wheel, or impart additional steering torque to turn the steering wheel in a particular direction.

It should be understood that various algorithms, methods, mechanisms for determining how/when to impart influential control on a driver by way of influential control component 300. Such algorithms, methods, mechanisms may be programmable via safety control unit 220 and one or more of its determination units, and various embodiments contemplate the incorporation of such algorithms, methods, mechanisms to achieve the desired influential control. It should be understood that scope of the present application contemplates such a variety of such algorithms, methods, and mechanisms for effectuating influential control/upon which influential control may be based through an influential control component 300, such as a DCW(s) that can effect the manner in which the driver actuates the steering wheel.

It should also be noted that influential control can be effectuated through more fine-grained control. For example, in some embodiments, amount of actuation via influential control component 300 can be increased or reduced, where "harder" or "sharper" turns are cued by a DCW(s) that spins or rotates faster in a desired direction. More gradual or gentle turns are cued by a DCW(s) that spins or rotates slower in a desired direction. In some embodiments, influential control component 300 can be controlled in accordance with a series of operations. For example, in some embodiments, influential control component 300 may comprise a plurality of DCWs, two subsets of which comprise DCWs intended to provide cues felt by a drive's left and right hands. Determination unit 322 may signal influential control component 300 to actuate only one subset of the plurality of DCWs. That is, in a turn navigation scenario, reinforcing a right turn may be accomplished by determination unit 322 controlling influential control component 300 to actuate only the subset of DCWs in contact with the driver's right hand. The subset of DCWs may be controlled to rotate in a clockwise direction (to the right) to cue a right turn.

Data collection at a memory unit 220a of safety control unit 220, e.g., a cache, a data repository, log, etc. may comprise continual receipt and storing/logging of information regarding the commands that control unit 216 is sending. Memory unit 220a may also store/log information regarding activation of influential control component 300. In some embodiments, memory unit 220a may offload stored information to a remote data store, e.g., data store 224. Thus, any processing of autonomous control data can include both command information from control unit 216 regarding autonomous control operations, e.g., commands to move HEV 100, along with information regarding when or how influential control component 300 was activated, to what extent, and so on. Such information can be useful in determining, e.g., erroneous or potentially erroneous operation of autonomous control system 200 that would otherwise be lost in conventional systems where simple disengagement of autonomous control actually prevents autonomous control systems from operating at all, including sending autonomous control commands. Such information can also be useful in determining, e.g., expected driver response(s) to certain road obstacles, road conditions, actuation of actuators 206, and so on. Such information can be used to develop or refine the underlying logic (algorithms, methods, mechanisms) for controlling how/when influential control component 300 is to be activated and to what extent/level, that may be implemented in safety control unit 220, determination unit 322, control unit 216, etc.

In some embodiments, data collection can comprise monitoring the operation of autonomous control system or aspects thereof, e.g., control unit 216 over time. Thus, the aforementioned data/information that is stored/logged can include time-series data involving some subset of or all aspects of autonomous control system 200. For example, commands from control unit 216 to actuators 206 may be monitored, and time-series data representative of the operating states/conditions of control unit 216 may be captured. For example, time-series data may be collected which includes not only the commands/operating conditions or characteristics of control unit 216, but also determination units 222, 222a, 222b, 322, external sensor 201, GPS reception unit 202, and so on.

Figure 4A:
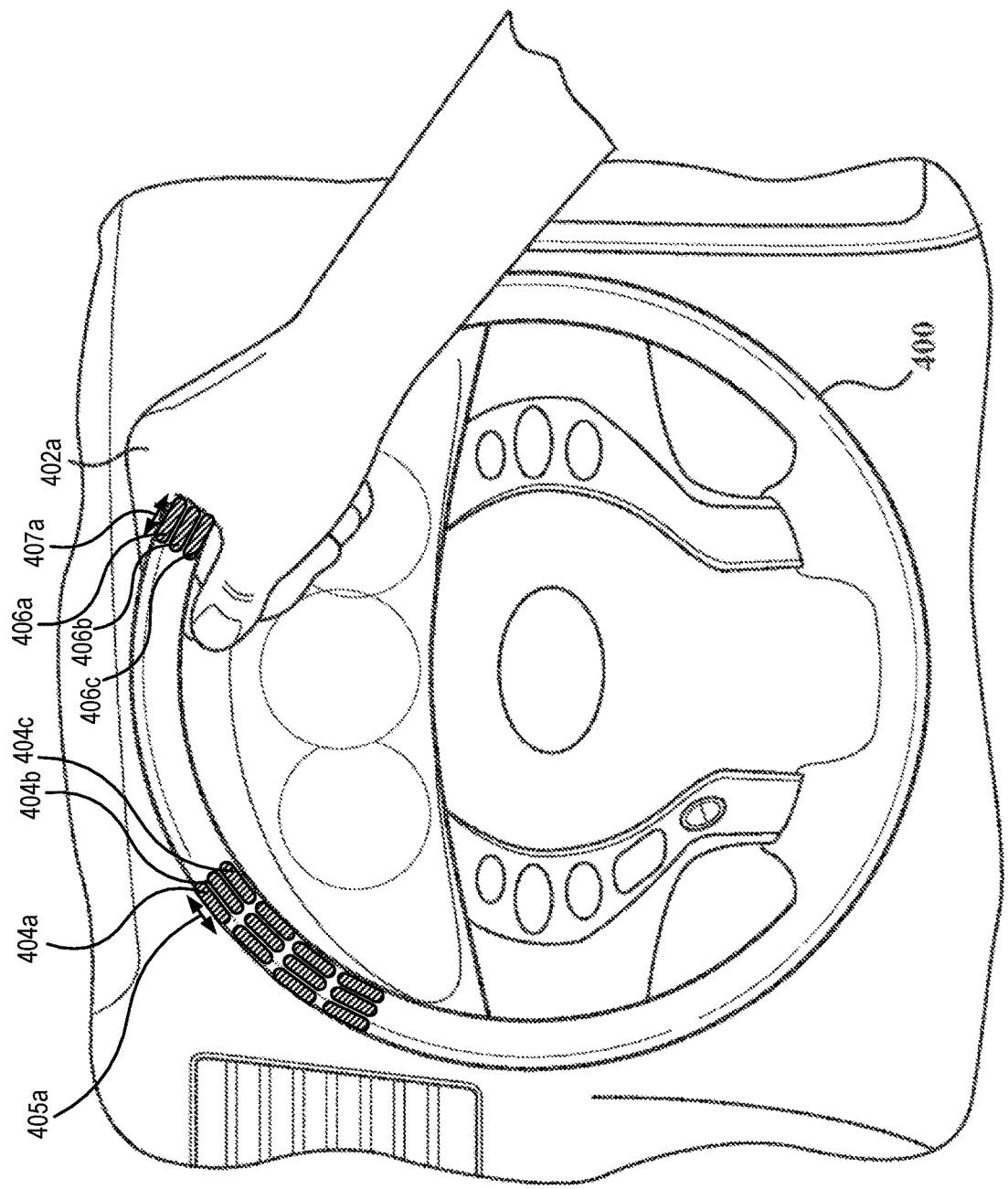
FIGS. 4A-4C illustrate example directional cue wheels used to effectuate influential control in accordance with one embodiment.
Figure 4B:
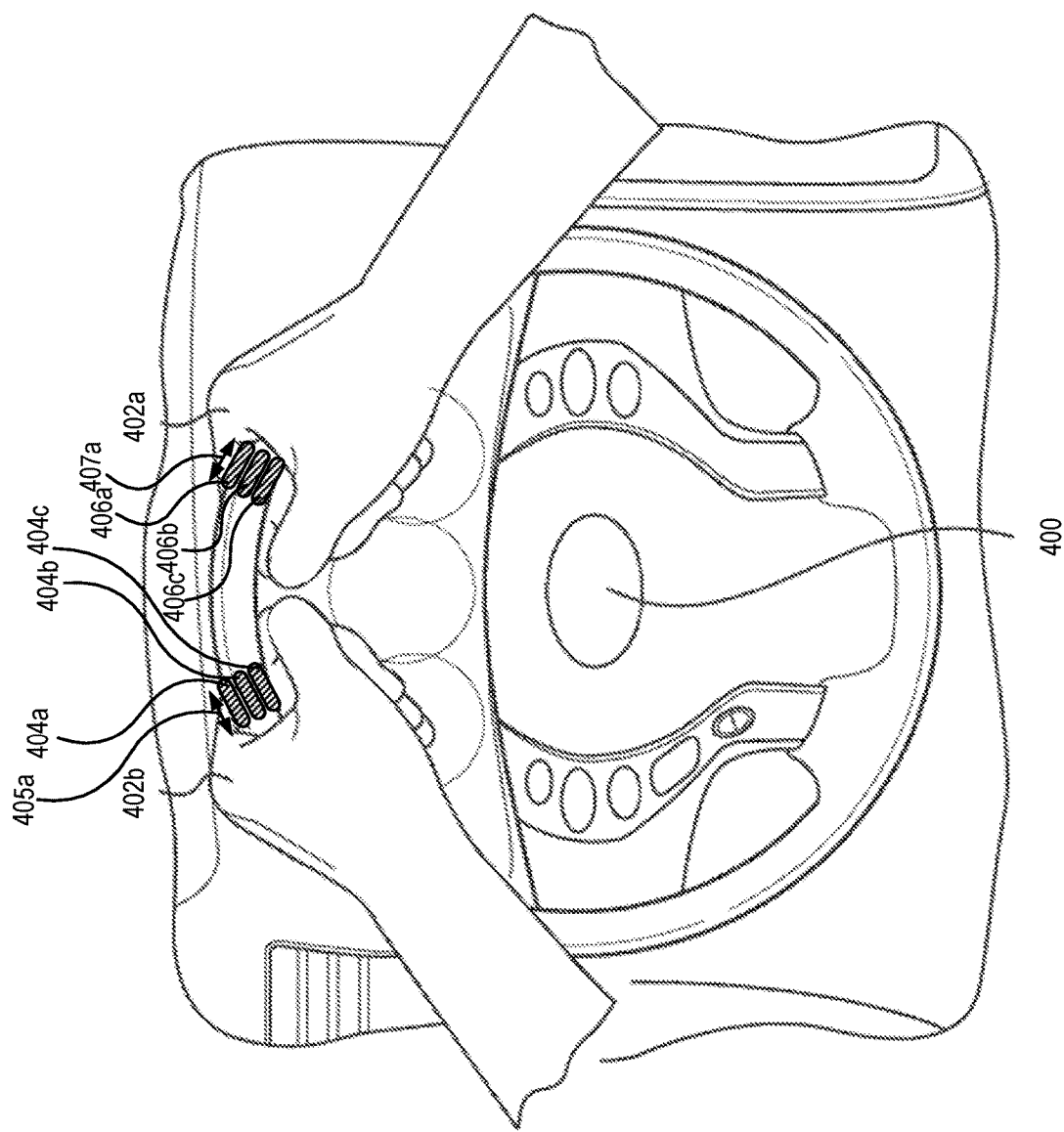

As alluded to above, in some embodiments, influential control component 300 may comprise one or more DCWs. FIGS. 4A and 4B illustrate an example of such DCWs capable of imparting influential control over a driver that is gripping steering wheel 400. As illustrated in FIG. 4A, a driver's hand, e.g., hand 402a, may be influenced resulting in hand 402a turning steering wheel 400 in a particular direction or with a particular amount of torque. A first subset or array of DCWs may be implemented to contact/influence a driver's left hand (not shown in FIG. 3). This first array of DCWs may comprise a plurality of wheels (some of which are identified as DCWs 404a, 404b, and 404c) configured to rotate clockwise or counter-clockwise (designated via arrow 405a) to cue the direction in which the steering wheel 400 should be turned. A second array or subset of DCWs (some of which are identified as DCWs 406a, 406b, and 406c) may be configured to rotate clockwise or counter-clockwise (designated via arrow 407a) to cue the direction in which the steering wheel 400 should be turned.

As can be appreciated, and also referring to FIG. 4B, a driver gripping steering wheel 400 with his/her hand(s), such as hands 402a and 402b, will feel or sense the rotation of one or more DCWs, such as DCWs 406a, 406b, and 406c and 404a, 404b, 404c, respectively. Feeling one or more DCWs rotate counterclockwise can cue the driver to steer to his/her left, while feeling one or more DCWs rotate clockwise can cue the driver to steer to his/her right. In some embodiments, the speed/rate at which a DCW rotates may signify a desired or target degree of rotation, or a more "forceful" turn to the left, etc.

FIGS. 4A and 4B illustrate an embodiment where DCWs are implemented at approximately the 10 and 2 o'clock positions of steering wheel 400, but DCW arrays can be implemented anywhere on/along the circumference of steering wheel 400. For example, a single array of DCWs may span the entire circumference of steering wheel 400. For example, multiple arrays of DCWs (e.g., three or more) may be positioned along the circumference at periodic/aperiodic intervals. In this way, different ways to achieve contact between one or more DCWs and a driver's hand(s) can be leveraged. In some embodiments, an array of DCWs may comprise columns of multiple DCWs. In FIGS. 4A and 4B, for example, DCWs 404a, 404b, and 404c may comprise one such column of a DCW array. In some embodiments, an array of DCWs may comprise a singular row of DCWs, a double row of DCWs or more rows of DCWs. In some embodiments, DCWs may be positioned on some or all surfaces of a steering wheel, e.g., a surface(s) facing the driver and a surface(s) facing away from the driver, etc.

In some embodiments, each DCW of a DCW array may rotate in a particular direction to cue an intended direction of steering wheel rotation. In some embodiments only those DCWs in contact with a driver's hand(s) actuate and rotate in a desired direction and in some embodiments, at a particular speed. That is, additional sensors (temperature, pressure, camera(s), etc. may be used to gauge positioning of the driver's hand(s) relative to locations on steering wheel 400. Based on this determination of positioning, those DCWs that are proximate or in contact with a hand(s) (within some determined distance from a part(s) of driver's hand(s)) may be actuated, while other DCWs remain unactuated. In some embodiments, contact made by a hand(s) on a DCW(s) may "activate" that particular DCW such that if influential controls are to be sent to any of the DCWs, those "active" DCWs are actuated, whereas other, non-activated DCWs are not actuated. In still other embodiments, different patterns or sequences of actuating DCWs may be performed to influence driver control over steering wheel 400. For example, upon receiving a signal(s)/instruction(s) to impart influential control, influential control component 300 may first actuate DCWs 404a-404c, then actuate those DCWs immediately to the left of DCWs 404a-404c, and so on. The direction in which actuation of DCWs progresses may also suggest a direction in which steering wheel 400 should be rotated.

Figure 4C:
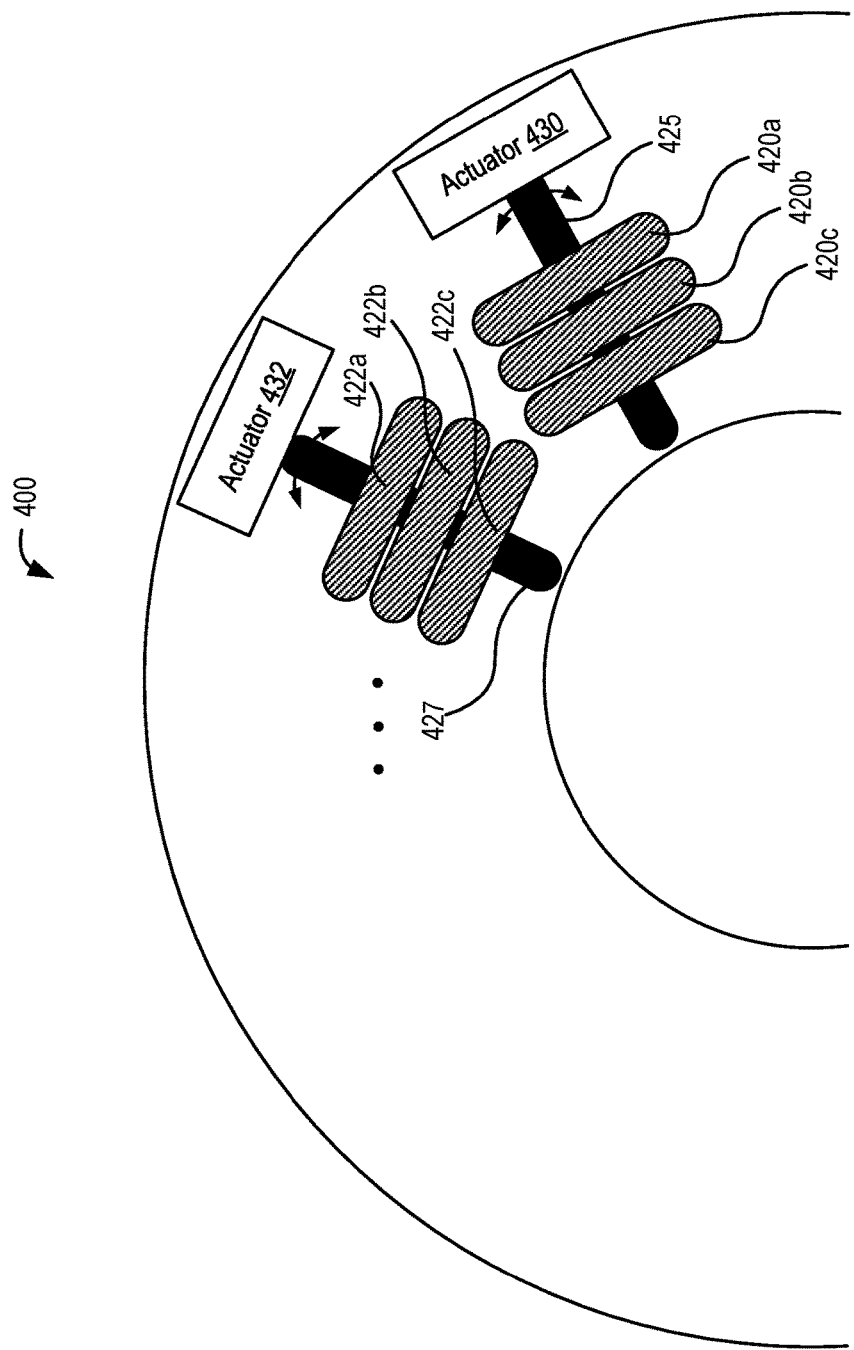

FIG. 4C illustrates an example DCW configuration. In particular, FIG. 4C illustrates two columns of a DCW array, a first column including DCWs 420a, 420b, and 420c, a second column including DCWs 422a, 422b, and 422c. Each DCW may have a surface(s) that contacts a driver's hand(s). In some embodiments, the surface(s) of each DCW may be patterned, knurled, or otherwise formed in a way to provide a desired level(s) of influential cueing. In this embodiment, each DCW of a column of DCWs may be actuated by a single actuator, 430 and 432, respectively. Actuators 430 and 432 may comprise rotating actuators operatively connected to their respective DCWs, such that rotation of actuators 430 and 432 result in corresponding rotation of DCWs 420a, 402b, 420c, and DCWs 422a, 422b, and 422c, respectively. In some embodiments, actuators 430 and 432 need not necessarily be rotating actuators, but configured to effectuate rotational movement in one or more DCWs. To effectuate movement in multiple DCWs simultaneously, as illustrated in FIG. 4C, actuators 430 and 432 may be operatively connected to their DCWs by way of shafts 425 and 427, respectively. When actuators 430 and 432 receive control signals/instructions, they may induce corresponding rotation (and in some embodiments at an appropriate speed corresponding to a target degree of intended rotation of the steering wheel 400) in shafts 425 and 427, which in turn induce corresponding rotation in DCWs 420a, 420b, 420c, 422a, 422b, and 422c.

Although embodiments illustrated and described in the present disclosure comprise DCWs oriented "in line" with the circumference of steering wheel 400, DCWs may be oriented in other ways, e.g., perpendicular to their currently illustrated orientation, at some other angle relative to their currently illustrated orientation. In some embodiments, some DCWs of an array may be oriented differently that other DCWs of the same array or another array(s). In some embodiments, each DCW may have its own corresponding actuator, rather than one actuator controlling a plurality of DCWs. Each DCW may comprise a ring or other circular member with an aperture or connection point configured to accept a shaft or other actuating component. Plastic, metal, or other material/combination of materials may be used for a DCW.

Each actuator, such as actuators 430 and 432, may further comprise a control system (not shown), which may comprise one or more communication circuits or elements that may allow for wired or wireless communication with autonomous control system 200 or one or more elements thereof including, e.g., safety control unit 220, one or more determination units, etc. For example, an actuator control system may comprise a wireless transceiver with an associated antenna or a wired I/O interface with an associated hard-wired data port (not illustrated). Accordingly, control signals to be transmitted to one or more DCWs may be received by the actuator control system, from a signal transmitter implemented in steering wheel 400, a seat of vehicle 100, or other transmitter component. The actuator control system may further comprise a battery/power element (not shown) for providing the signals and power to an actuator(s).

In some embodiments, as alluded to above, steering wheel 400 may be configured with one or more sensors that are able to detect the amount of pressure, the amount of contact, etc. that a driver's hand(s) may have with steering wheel 400, where the driver's hand(s) are with respect to steering wheel 400, e.g., where on steering wheel 400 the driver's hand(s) are gripping/contacting steering wheel 400. For example, the sensors, when implemented, e.g., on a surface of the steering wheel 400 may be able to detect how much of a driver's hands are in contact with steering wheel 400, which in turn may be treated as an indicator of hand positioning, and in turn may inform control unit 216, which actuator(s) to actuate or by how much. It should be understood that in some embodiments, no sensors are necessarily required.

Depending on a current state of grip/hand contact with steering wheel 400, determination unit 322 may transmit one or more control signals to actuators 430 and 432, for example, (an embodiment of influential control component 300 of FIG. 3) to effectuate a desired amount of rotation in a particular direction. For example, and as discussed above, control unit 216 may, based on input/analysis regarding road conditions (current, past, future), environmental considerations, target route, destination, and the like, output one or more control signals to actuators 206 to effectuate desired autonomous or semi-autonomous control over vehicle 100. Determination unit 322 may compare the intended autonomous or semi-autonomous control aspects, e.g., amount of forward motive force, turning radius and corresponding steering wheel torque/rotational angle, etc., to current vehicle operating characteristics regarding those same aspects, e.g., current amount of forward motive force, current amount of steering wheel torque being applied, current rotational angle, etc. In this way, determination unit 322 is able to ascertain whether or not vehicle 100 is behaving in accordance with the behavior intended by control unit 216/autonomous control system 200.

To reinforce the intended and actual operation of vehicle 100, as noted above, one or more actuators, such as actuators 430 and 432 may be controlled to electrically cue a driver to turn steering wheel 400 in a particular direction and by some particular amount/angle of rotation. If the actual operation of vehicle 100 does not comport with the intended operation of vehicle 100 (per autonomous control system 200/control unit 216), determination unit 322 may transmit one or more control signals to counteract the current forward motive force, current steering wheel torque/rotational angle, etc. This may also indicate to the driver that he/she may not be operating vehicle 100 as is intended/should be operated. The amount by which steering wheel rotation, for example, is effectuated, increased, or lessened may be calculated, e.g., in conjunction with calculation unit 214. In some embodiments, the difference between intended operating characteristics and actual operating characteristics during some time period(s) may indirectly or directly be reflected in the amount of rotation cued to be applied, increased, or lessened. In some embodiments, the torque output by a DCW or the rate at which a DCW is rotated may be limited to some extent to avoid harming (e.g., scratching, irritating) a driver's hand(s).

It should be understood that the illustrated embodiment of FIG. 4C is only one example of a DCW mechanism/system. That is, embodiments of the present disclosure contemplate other implementations of a mechanism configured to impart cues suggesting directional or level of actuation, e.g., steering torque. For example, other configurations or types of actuators may be used to effectuate the target rotation (direction or speed) of a DCW, known now or in the future. Moreover, the embodiment illustrated in FIG. 4C and described above, has been simplified for purposes of description herein. That is, other elements/components may be incorporated into an actuator or DCW to effectuate movement.

In some embodiments, monitored operation of one or more DCWs may provide feedback that can inform the programming or configuration of safety control unit 220, determination unit 322, the DCWs/actuators themselves, etc. That is, in some embodiments, certain autonomously or semi-autonomously controlled vehicle maneuvers may be associated with drivers better or more closely following the intended vehicle maneuvers and vice-versa. For example, some combination of speed reduction and steering wheel angle of rotation may be used to achieve a desired result, e.g., properly navigating a particular turn. It may be that a greater amount of speed reduction may require less severe steering wheel manipulation/torque while greater speed requires more severe steering to compensate for that increased speed. In this scenario, feedback may suggest that drivers are more comfortable with the first combination of operations (greater speed reduction with less steering wheel rotation) Accordingly, autonomous control system 200 may be adjusted or reprogrammed to respond to navigating the same turn or similar turns in the future commensurate with the first combination of operations.

Figure 5:
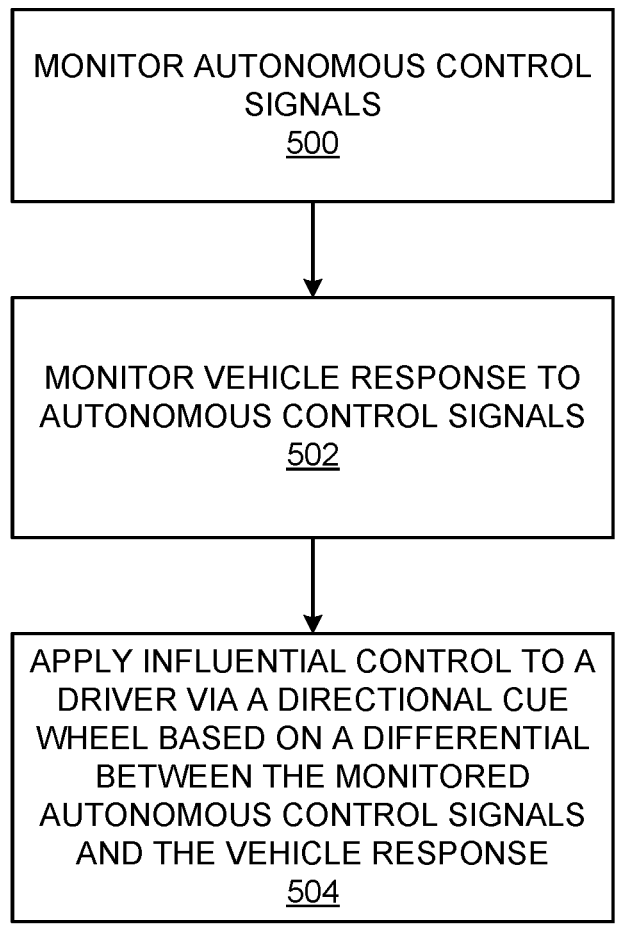
FIG. 5 is a flow chart illustrating operations that may be performed to effectuate influential control in accordance with one embodiment.

FIG. 5 is a flow chart illustrating example operations that may be performed to impart influential control over a driver operating a vehicle. At operation 500, autonomous control signals may be monitored. As described above, a safety control unit or one or more determination units thereof may receive autonomous control signals from an autonomous control unit, e.g., control unit 216 of autonomous control system 200 (FIG. 2A). The autonomous control signals may reflect desired operation of the vehicle, e.g., activation or actuation or one or more actuators, e.g., actuators 206 (which can be embodied as a steering wheel actuator, a brake pedal actuator, and so on).

At operation 502, the vehicle response to the autonomous control signals may be monitored. As described above, the autonomous control system of a vehicle, e.g., autonomous control system 200 may intend for vehicle 100 to operate in a particular manner, e.g., turn a certain direction by a certain amount, while moving at a certain speed, etc. Vehicle 100 may have external sensors (e.g., sensors 201), internal sensors (e.g., sensors 203), as well as other vehicle systems that may be able to provide information regarding a current operational state or condition of vehicle 100. This information can be compared to that reflecting the intended operation of vehicle 100. For example, autonomous control signals from control unit 216 to actuators 206 may indicate a desire to turn the vehicle 90 degrees commensurate within one second time period.

In response to the comparison at operation 502, at operation 504, influential control is applied to a driver of the vehicle via one or more DCWs based on the differential between the monitored autonomous control signals and the vehicle response. Following the above example, after the one second time period, it may be determined from one or more sensors that vehicle 100 has only turned 70 degrees in the desired direction. Accordingly, control unit 216 may determine a need to induce additional steering torque to the left, for example, after which signals may be set to influential control component 300 (in this example, a plurality of DCWs). In some scenarios, influential control as described herein may be used as strictly, a notification mechanism, whereas in other scenarios, influential control as described herein may be used to prompt and/or effectuate increased/ decreased action or involvement by the driver with respect to a particular actuator(s) of vehicle 100.

Figure 6:
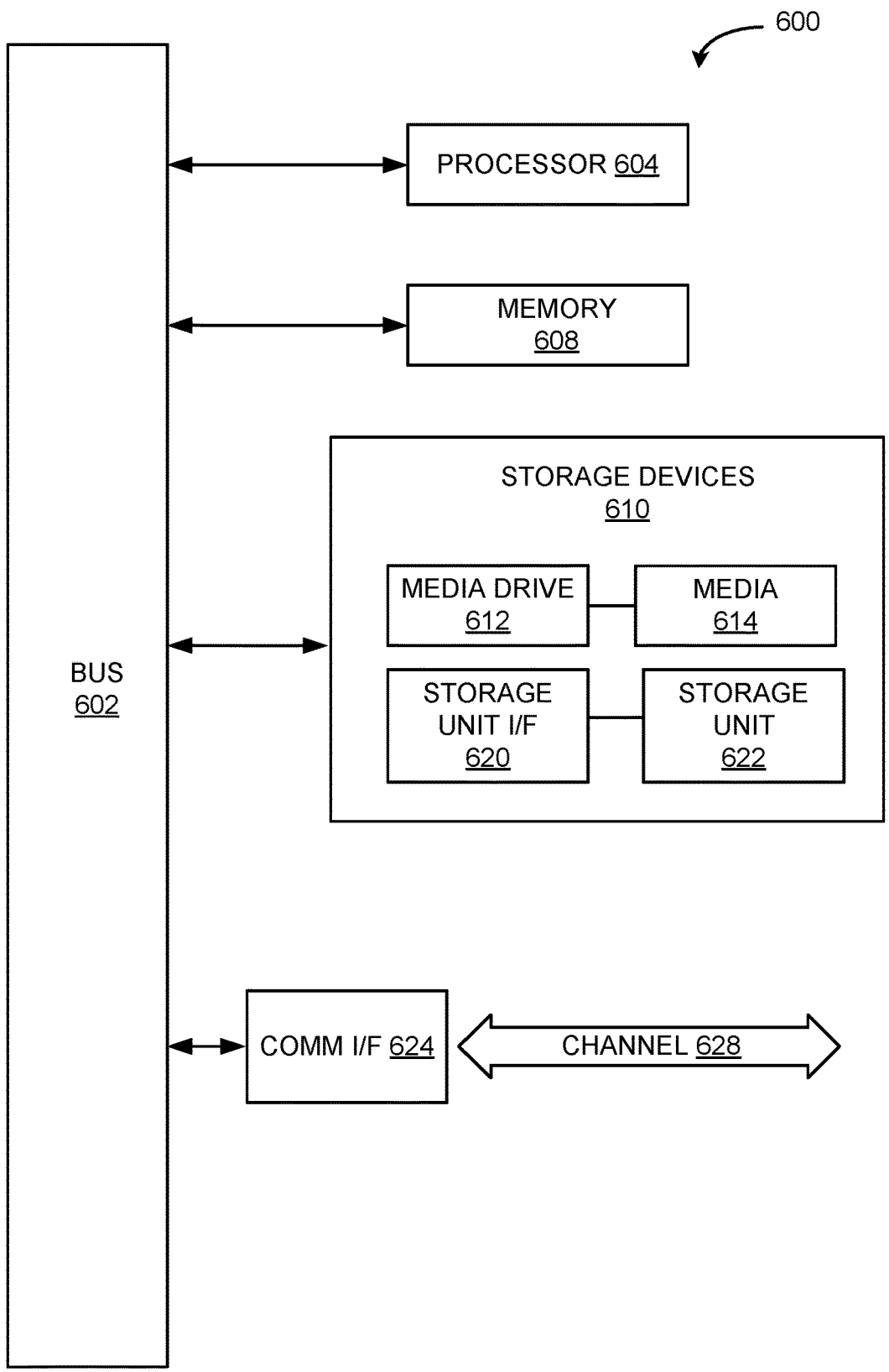
FIG. 6 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 6. Various embodiments are described in terms of this example-computing component 600. After reading this description, it will become apparent to a person skilled in the relevant art how to implement the application using other computing components or architectures.

Referring now to FIG. 6, computing component 600 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 600 might also represent computing capabilities embedded within or otherwise available to a given device. For example, a computing component might be found in other electronic devices such as, for example, portable computing devices, and other electronic devices that might include some form of processing capability.

Computing component 600 might include, for example, one or more processors, controllers, control components, or other processing devices. This can include a processor 604. Processor 604 might be implemented using a general-purpose or special-purpose processing engine such as, for example, a microprocessor, controller, or other control logic. Processor 604 may be connected to a bus 602. However, any communication medium can be used to facilitate interaction with other components of computing component 600 or to communicate externally.

Computing component 600 might also include one or more memory components, simply referred to herein as main memory 608. For example, random access memory (RAM) or other dynamic memory, might be used for storing information and instructions to be executed by processor 604. Main memory 608 might also be used for storing temporary variables or other intermediate information during execution of instructions to be executed by processor 604. Computing component 600 might likewise include a read only memory ("ROM") or other static storage device coupled to bus 602 for storing static information and instructions for processor 604.

The computing component 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a solid-state drive, a magnetic tape drive, an optical drive, a compact disc (CD) or digital video disc (DVD) drive (R or RW), or other removable or fixed media drive might be provided. Storage media 614 might include, for example, a hard disk, an integrated circuit assembly, magnetic tape, cartridge, optical disk, a CD or DVD. Storage media 614 may be any other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing component 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory component) and memory slot. Other examples may include a PCMCIA slot and card, and other fixed or removable storage units 622 and interfaces 620 that allow software and data to be transferred from storage unit 622 to computing component 600.

Computing component 600 might also include a communications interface 624. Communications interface 624 might be used to allow software and data to be transferred between computing component 600 and external devices. Examples of communications interface 624 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 624 may be carried on signals, which can be electronic, electromagnetic (which includes optical) or other signals capable of being exchanged by a given communications interface 624. These signals might be provided to communications interface 624 via a channel 628. Channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 608, storage unit 620, media 614, and channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 600 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A vehicle, comprising:
   an autonomous control system adapted to provide one or more commands to autonomously control one or more systems of the vehicle; and
   an influential control component adapted to impart influential control over a driver's operation of a steering wheel of the vehicle, the imparted influential control effectuating cues for the driver to adjust the driver's actuation of the steering wheel by rotating one or more directional cue wheels on a surface of the steering wheel;
   wherein the directional cue wheels rotate about an axis perpendicular to an axis of rotation of the steering wheel.

2. The vehicle of claim 1, wherein the one or more directional cue wheels are positioned on a rim surface of the steering wheel.

3. The vehicle of claim 1, wherein a direction of rotation of the one or more directional cue wheels comprises one of a counterclockwise direction and a clockwise direction, the counterclockwise and clockwise directions corresponding to cues to turn the vehicle to the left and right, respectively.

4. The vehicle of claim 1, wherein a speed of rotation of the one or more directional cue wheels corresponds to a target amount of steering torque to be applied to the steering wheel.

5. The vehicle of claim 1, further comprising an actuator operatively connected to the one or more directional cue wheels via a rotating shaft, the rotating shaft imparting rotational movement to the one or more directional cue wheels.

6. The vehicle of claim 5, wherein the influential control component receives instructions from the autonomous control system to impart the influential control.

7. The vehicle of claim 6, wherein the influential control component transmits actuation control signals to the actuator instructing the actuator to impart the rotational movement in accordance with a determined speed of rotation.

8. The vehicle of claim 6, wherein the influential control component transmits actuation control signals to the actuator instructing the actuator to impart the rotational movement in accordance with a determined direction of rotation.

9. The vehicle of claim 5, wherein computer code, when executed, further causes a processor of the autonomous control system to transmit instructions from the autonomous control system of the vehicle to the actuator to impart the rotational movement.

10. The vehicle of claim 9, wherein the computer code comprises actuation control signals instructing the actuator to impart the rotational movement in accordance with a determined speed of rotation.

11. The vehicle of claim 9, wherein the computer code comprises actuation control signals instructing the actuator to impart the rotational movement in accordance with a determined direction of rotation.

12. The vehicle of claim 1, wherein the directional cue wheels are fixed in a position relative to the steering wheels and rotate about the axis at the position.

13. A vehicle, comprising:
   a processor; and
   a memory unit operatively connected to the processor and including computer code that when executed, causes the processor to:
   determine that the vehicle is approaching an environment requiring a first vehicle action;
   determine that the driver is applying a second vehicle action; and
   rotate one or more directional cue wheels on a surface of a steering wheel of the vehicle to indicate stopping the second vehicle action and conform to the first vehicle action;
   wherein the directional cue wheels rotate about an axis perpendicular to an axis of rotation of the steering wheel.

14. The vehicle of claim 13, wherein altering the vehicle's operating characteristics comprises signaling one or more direction-cue wheels (DCWs) to conform to the first vehicle action.

15. The vehicle of claim 13, further comprising determining a difference between the first vehicle action and the second vehicle action.

16. The vehicle of claim 13, wherein the second vehicle action fails to complete the first vehicle action, and wherein altering the vehicle's operating characteristics comprises applying a correction to complete the first vehicle action.

* * * * *